United States Patent
Ehrman et al.

(10) Patent No.: US 6,833,417 B2
(45) Date of Patent: Dec. 21, 2004

(54) PROCESSES FOR TRANSITIONING BETWEEN CHROME-BASED AND MIXED POLYMERIZATION CATALYSTS

(75) Inventors: Fred David Ehrman, Houston, TX (US); Mark Bradley Davis, Hurricane, WV (US); Ronald Steven Eisinger, Charleston, WV (US); Mark Gregory Goode, Hurricane, WV (US); Michael Allen Kinnan, Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/835,412

(22) Filed: Apr. 29, 2004

(65) Prior Publication Data

US 2004/0214969 A1 Oct. 28, 2004

Related U.S. Application Data

(63) Continuation-in-part of application No. 10/715,651, filed on Nov. 17, 2003.
(60) Provisional application No. 60/437,204, filed on Dec. 31, 2002.

(51) Int. Cl.⁷ .................................................. C08F 2/34
(52) U.S. Cl. .......................... 526/82; 526/84; 526/86; 526/901
(58) Field of Search ......................... 526/82, 84, 86, 526/901

(56) References Cited

U.S. PATENT DOCUMENTS

| | | | | |
|---|---|---|---|---|
| 4,181,790 A | * | 1/1980 | Maahs et al. ................ 526/143 |
| 4,306,044 A | | 12/1981 | Charsley ...................... 526/84 |
| 4,460,755 A | * | 7/1984 | Williams et al. .............. 526/84 |
| 4,834,947 A | | 5/1989 | Cook et al. ................... 422/117 |
| 5,227,438 A | | 7/1993 | Rebhan ......................... 526/82 |
| 5,270,408 A | | 12/1993 | Craddock, III et al. ....... 526/82 |
| 5,371,053 A | | 12/1994 | Agapiou et al. .............. 502/56 |
| 5,442,019 A | | 8/1995 | Agapiou et al. .............. 526/82 |
| 5,672,665 A | | 9/1997 | Agapiou et al. .............. 526/82 |
| 5,753,786 A | | 5/1998 | Agapiou et al. .............. 526/82 |
| 6,284,849 B1 | | 9/2001 | Almquist et al. ............. 526/82 |
| 6,359,084 B1 | | 3/2002 | Herzog et al. ................ 526/84 |

FOREIGN PATENT DOCUMENTS

| | | |
|---|---|---|
| EP | 0116917 A1 | 8/1984 |
| EP | 0471479 B1 | 2/1992 |
| EP | 0829491 A2 | 3/1998 |
| WO | WO 92/14766 | 9/1992 |
| WO | WO 98/30599 | 7/1998 |

\* cited by examiner

Primary Examiner—Fred Teskin
(74) Attorney, Agent, or Firm—Kevin M. Faulkner

(57) ABSTRACT

A process of transitioning from a first polymerization reaction conducted in the presence of a mixed catalyst system to a second polymerization reaction conducted in the presence of a chrome-based catalyst system is disclosed, the polymerization reactions being conducted in one embodiment in a polymerization zone of a gas phase fluidized bed reactor which contains a fluidized bed of polymer particles by the essentially continuous passage of monomer gases through the polymerization zone, comprising:

a) discontinuing the introduction of the mixed catalyst system into the reactor;
b) maintaining polymerization conditions in the reactor and permitting polymerization to continue for a period of time to allow the components of the mixed catalyst system present in the reactor to produce additional polymer particles;
c) introducing a deactivating agent into the fluidized bed in an amount sufficient to deactivate the mixed catalyst system;
d) establishing optimal conditions within the reactor for the chrome-based catalyst system; and
e) introducing the chrome-based catalyst system into the reactor characterized in that the amount of polymer particles in the fluidized bed is substantially maintained in the polymerization zone during the transition steps.

19 Claims, No Drawings

PROCESSES FOR TRANSITIONING BETWEEN CHROME-BASED AND MIXED POLYMERIZATION CATALYSTS

CROSS-REFERENCE TO RELATED APPLICATION

The present application is a Continuation-in-Part of, and claims priority to, U.S. Ser. No. 10/715,651, filed Nov. 17, 2003, which claims priority to provisionally filed U.S. Ser. No. 60/437,204 filed on Dec. 31, 2002.

FIELD OF THE INVENTION

This invention relates to processes for transitioning between polymerization catalyst systems, especially catalyst systems that are incompatible with each other. More particularly, the invention relates to processes for transitioning from olefin polymerization reactions utilizing chromium-based catalyst systems to olefin polymerizations utilizing metallocene/Ziegler-Natta mixed catalyst systems and vice-versa.

BACKGROUND OF THE INVENTION

During the production of olefin polymers in a commercial reactor it is often necessary to transition from one type of catalyst system producing polymers having certain properties and characteristics to another catalyst system capable of producing polymers of different chemical and/or physical attributes. Transitioning between similar catalyst systems, or compatible catalyst systems, for instance, generally takes place easily. However, where the catalyst systems are of different types or are otherwise incompatible, the process is typically complicated. For example, transitioning from a chromium-based catalyst to a metallocene catalyst, or vice versa, normally requires a long transition period. In addition, the polyolefins produced during this transition period will continuously change in properties resulting in off-grade products. If the transition from one catalyst system to another requires substantial changes in reactor conditions, the risks of encountering production problems and producing polymers having extreme properties are increased.

When a polymerization reaction catalyzed by a first catalyst is to be changed to a polymerization reaction catalyzed by a second catalyst wherein the second catalyst is incompatible with the first catalyst, several methods of performing the transition are possible. One possibility is to kill the existing polymerization reaction, empty the reactor, recharge and start again with a new catalyst. The benefit of this procedure is that the amount of remaining material in the plant from the previous run will be small. The disadvantages of this procedure are that it takes several hours to build up a desired level of solids inside the reactor and traces of material from the first polymerization reaction remain in the reactor since it is practically impossible to completely remove such material.

Another possibility is to make a running transition where the change from one type of produced polymer to another is continuous, that is without interrupting the polymerization reaction. When transitioning from a first to a second catalyst, the initial step is to discontinue the catalyst feed. The new catalyst is then introduced and, if necessary, the reactor conditions are adapted to the conditions required by the new catalyst.

U.S. Pat. No. 6,284,849 to Almquist et al. discloses a method for transitioning between a chromium-based catalyst and a metallocene. The examples therein utilize Phillips type chromium-based catalysts and bisCp metallocenes. So-called Phillips type chromium-based catalysts are chromium oxide-on-silica catalysts. The catalysts are formed by impregnating a $Cr^{+3}$ species into silica, followed by fluidization of the silica matrix at ca. 400° C.–900° C. wherein $Cr^{+3}$ is converted to $Cr^{+6}$. The Phillips type chromium-based catalyst is also commonly referred to in the prior art as "inorganic oxide-supported $Cr^{+6}$".

It would be highly advantageous to have a process for transitioning between different or incompatible catalyst systems, without the need for halting the polymerization reaction, emptying the reactor to rid it of the original catalyst system and restarting the polymerization reaction with another catalyst system. In addition, it would be advantageous if the process for transitioning could reduce the amount of off-grade material produced during the transition process, reduce the transition time, increase the robustness and stability of the transition process and avoid the need to open the reactor to charge the seed bed.

SUMMARY OF THE INVENTION

A process of transitioning from a first polymerization reaction conducted in the presence of a mixed catalyst system to a second polymerization reaction conducted in the presence of a chrome-based catalyst system is disclosed, the polymerization reactions being conducted in one embodiment in a polymerization zone of a gas phase fluidized bed reactor which contains a fluidized bed of polymer particles by the essentially continuous passage of monomer gases through the polymerization zone, comprising:

a) discontinuing the introduction of the mixed catalyst system into the reactor;

b) maintaining polymerization conditions in the reactor and permitting polymerization to continue for a period of time to allow the components of the mixed catalyst system present in the reactor to produce additional polymer particles;

c) introducing, for example by injecting, a deactivating agent into the fluidized bed in an amount sufficient to deactivate the mixed catalyst system;

d) establishing optimal conditions within the reactor for the chrome-based catalyst system; and e) introducing the chrome-based catalyst system into the reactor;

characterized in that the amount of polymer particles in the fluidized bed is substantially maintained in the polymerization zone during the transition steps.

DETAILED DESCRIPTION OF THE INVENTION

The present invention relates to processes for transitioning between catalysts and/or catalyst systems to convert a reactor from producing one type of product to another with minimal reactor down-time. For the purposes of this patent specification and appended claims the terms "catalyst" and "catalyst system" shall be used interchangeably and shall have the identical meaning. The term "running transition" as used herein means maintaining polymerization conditions in the reactor and permitting polymerization to continue during a transition, from commencement thereof to completion thereof wherein normal operations are established or re-established. The terms "chromium-based catalyst" and "chrome-based catalyst" are used interchangeably.

According to a preferred embodiment, the process is one for transitioning from a first polymerization reaction conducted in the presence of a first catalyst system to a second polymerization reaction conducted in the presence of a second catalyst system wherein the first and second catalyst systems are incompatible.

Compatible catalysts are those catalysts having similar kinetics of termination and insertion of monomer and comonomer(s) and/or do not detrimentally interact with each other.

For the purposes of this patent specification and appended claims the term "incompatible catalysts" shall refer to and mean catalysts that satisfy one or more of the following:

1) those catalysts that when present together reduce the activity of at least one of the catalysts by greater than 50%;
2) those catalysts that under the same reactive conditions produce polymers such that one of the polymers has a molecular weight that is more than twice the molecular weight of the other polymer; and
3) those catalysts that differ in comonomer incorporation or reactivity ratio under the same conditions by more than about 30%.

In particular, preferred processes are drawn to transitioning between chrome-based catalysts/catalyst systems and mixed metallocene/Ziegler-Natta catalysts/catalyst systems. It is contemplated that the transition between such incompatible catalysts may be from a chrome-based catalyst system to a mixed metallocene/Ziegler-Natta catalyst or from a mixed metallocene/Ziegler-Natta catalyst to a chrome-based catalyst system.

The processes preferably are used in gas phase, solution phase, slurry or bulk phase polymerization processes. Most preferably, the processes are used in a gas phase polymerization process in a fluidized bed reactor, In a typical continuous gas phase fluidized bed polymerization process for the production of polymer from monomer, a gaseous stream comprising monomer is passed through a fluidized bed reactor in the presence of a catalyst under reactive conditions. A polymer product is withdrawn from the fluidized bed reactor. Also withdrawn from the reactor is a cycle gas stream, which is continuously circulated and usually cooled. The cycle gas stream is returned to the reactor together with additional monomer sufficient to replace the monomer consumed in the polymerization reaction. For detailed descriptions of gas phase fluidized bed polymerization processes, see U.S. Pat. Nos. 4,543,399, 4,588,790, 5,028,670, 5,352,769 and 5,405,922.

For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, preferably 2–15 carbon atoms, for example, ethylene, propylene, 1-butene, 1-pentene, 4-methyl-1-pentene, 1-hexene, 1-octene, 1-decene and cyclic olefins such as styrene. Other monomers can include polar vinyl, dienes, norborene, acetylene and aldehyde monomers. In the preferred embodiments of the present invention, the gas composition contains ethylene and at least one alpha-olefin having 3 to 15 carbon atoms.

Typically, the gas composition also contains an amount of hydrogen to control the melt index of the polymer to be produced. In typical circumstances the gas also contains an amount of a dew point increasing or inducing component, for example, isopentane, with the balance of the gas composition made up of non-condensable inerts, for example, nitrogen.

Depending on the second catalyst to be introduced into the reactor, the gas composition, such as the comonomer and hydrogen gas concentrations, can be increased or decreased.

The specific reactor conditions depend, for example, on catalyst activity, type and amount of comonomer, type of polymer to be produced, and the production equipment. Consequently, the specific conditions that exist in the reactor during a transition between chromium and metallocene catalysts have to be determined for each specific product in a particular plant. However, in general the reactor conditions when using metallocene catalysts include a reduced feed of comonomer because the comonomers are much more uniformly incorporated in metallocene catalyzed polymers than in chromium catalyzed polymers of equal polymer density. The melt flow index can be adjusted by introducing hydrogen, and also, to a certain degree, ethylene. With metallocene catalysts the changes in reactor parameters give a much faster response than with chrome-based catalysts.

According to a preferred embodiment, the process involves a running transition from a steady-state operation with a chrome-based catalyst system to a steady-state operation with a mixed metallocene/Ziegler-Natta catalyst system. Most preferably, the chrome-based catalyst system is a silyl-chromate catalyst system. According to this process, the production of polymer according to the chrome-based catalyst system is terminated by stopping the introduction of the chrome-based catalyst system into the reactor. The appropriate reactor conditions for the chrome-based catalyzed reaction are maintained for a period of about 4 to 6 hours so as to allow as much as possible of the chrome-based catalyst system to react and be consumed.

Hydrogen gas ($H_2$) is typically added to chrome catalyzed reactions to tailor the molecular weight of the polymer product. If present, the $H_2$ must be removed as completely as possible before the transition to the metallocene/Ziegler-Natta mixed catalyst is begun. The $H_2$ can be removed by purging during the transition to metallocene or it can be eliminated from the gas composition early so the concentration can decrease naturally to avoid the need to purge the reactor.

Once any residual $H_2$ has been removed or reduced to acceptable levels, the appropriate conditions for the metallocene/Ziegler-Natta mixed catalyst can be built within the reactor. Once the appropriate conditions are achieved, the metallocene/Ziegler-Natta mixed catalyst feed is begun. Once the metallocene/Ziegler-Natta mixed catalyst reaction begins, the reaction temperature within the reactor is increased to about 105° C., preferably to a temperature in the range of from 95° C. to about 110° C., more preferably from about 99° C. to about 109 until reactor operability achieved. Increasing the temperature inhibits or prevents the production of low flow index (FI) material with any chrome-based catalyst, especially silyl-chromate catalyst, remaining in the reactor as chrome-based catalysts have been found to be very sensitive to reactor temperatures. Conversely, when transitioning from the mixed catalyst system to a chromium-based catalyst system, the reactor temperature should be maintained at or below 105° C., preferably at a temperature in the range of from about 90° C. to about 105° C., more preferably in the range of from about 93° C. to about 102° C. until reactor operability is achieved and assured.

While a running transition can be performed without the use of a deactivating agent, in a preferred embodiment, the chrome-based catalyst system is deactivated before commencing the introduction of the mixed metallocene/Ziegler-Natta catalyst system and vice-versa. In general, such a transition procedure is started by discontinuing the feed of the chrome-based catalyst system and then introducing a deactivating agent into the reaction medium to kill or inhibit the catalytic activity of the chrome-based catalyst system. During the transition, all catalytic components involved will become exposed to the same reaction medium. Consequently, the agent intended to deactivate the chrome-based catalyst system will also come into contact with the mixed metallocene/Ziegler-Natta catalyst system and preferably does not adversely affect the activity of the mixed system. For chrome-based catalyst systems, especially silyl-chromate catalysts, a suitable deactivating agent can be selected from the group of polar hydrocarbons, such as, for example, alcohols, glycols, phenols, ethers, ketones, aldehydes, and carboxylic acids. However, preferably, oxygen is used to deactivate the chrome-based catalyst. Those skilled in the art will recognize that the deactivating agent, when used in the chrome-based catalyst-to-mixed catalyst reactor transition, is preferably one that will "kill" or deactivate the chrome-based catalyst system but will have no or minimal adverse effect on the mixed catalyst system. Those skilled in the art will also recognize that another compound can be introduced into the reactor that reacts with the remaining components of the catalyst deactivator to prevent the mixed catalyst system from being deactivated. By "deactivate", it is meant that the compound in question is treated such that it no longer performs its intended function such as catalytic activity, ligand exchange, etc.

Once the chrome-based catalyst system has been deactivated, the partial pressure of ethylene in the reactor is reduced to about 60 to about 85 psig and the reactor is purged with ethylene to achieve at least five gas volume change outs of the reactor. After purging the reactor with ethylene, the appropriate conditions for the metallocene catalyst are built within the reactor. Similar to the process described above, once the appropriate conditions are achieved, the mixed catalyst feed is begun and once the mixed metallocene/Ziegler-Natta catalyzed reaction begins, the reaction temperature within the reactor is increased to about 105° C., preferably to a temperature in the range of from 95° C. to about 110° C., more preferably from about 99° C. to about 109 until reactor operability achieved.

According to another preferred embodiment, the process involves a running transition from a steady-state closed reactor operation with a mixed catalyst system to a steady-state operation with a chrome-based catalyst system ("mixed catalyst-to-chrome-based catalyst") in a single reactor. The transitioning from a first polymerization reaction conducted in the presence of a mixed catalyst system comprising to a second polymerization reaction conducted in the presence of a chrome-based catalyst system is described herein, wherein the polymerization reactions being conducted in a polymerization zone of a gas phase fluidized bed reactor which contains a fluidized bed of polymer particles by the essentially continuous passage of monomer gases through the polymerization zone, comprising the steps of:

a) discontinuing the introduction of the mixed catalyst system into the reactor;

b) maintaining polymerization conditions in the reactor and permitting polymerization to continue for a period of time to allow the components of the mixed catalyst system present in the reactor to produce additional polymer particles;

c) introducing to the reactor by any suitable means a deactivating agent into the fluidized bed;

d) establishing optimal conditions within the reactor for the chrome-based catalyst system; and e) introducing the chrome-based catalyst system into the reactor;

characterized in that the amount of polymer particles in the fluidized bed is substantially maintained in the polymerization zone during the transition steps.

More particularly, a closed reactor transition from a mixed catalyst system to a chromium-based catalyst system is effectuated. By "closed reactor transition", it is meant that the transition is performed without removal, replacement, or exchange of the polymer particles that form the polymer bed in the reactor, preferably in a gas phase fluidized bed reactor; the transition thus performed in such a manner that the polymerization reactor is not empty at any time, nor is the polymer bed substantially lowered at any time during the transition by more than 1 to 30 wt % its original level in the bed at any time in transitioning from one catalyst system to another catalyst system, the weight percent relative to the total initial amount of polymer in the bed at the time the mixed catalyst system's introduction into the reactor is halted. Stated another way, the "bed level", or level of polymer particles in the polymerization reactor is substantially maintained during the transition such that the bed level is not lowered by more than 1 to 30% from its original level at any time during the transition. Thus, the mixed catalyst-to-chrome-based catalyst transition is characterized in that the amount of polymer particles in the fluidized bed is substantially maintained in the polymerization zone during the transition steps described herein. In a particular embodiment, the amount of polymer particles or 'bed level' is increased during the transition by from 1 to 30 wt % by addition of polymer particles without removal of the original polymer particles in the reactor.

The transition from mixed catalyst, preferably not including a chromium-based catalyst system, to a chromium-based catalyst is effectuated according to the following embodiment. The transition is carried out in such a manner as to eliminate reactor fouling or polymer buildup on the reactor walls and other "operability problems". Experimental indicators of operability problems utilize the measurement of temperatures which exist at the inside wall of the reactor in one embodiment. The temperature can be measured using thermocouples known in the art as "skin thermocouples" since they measure temperature close to the reactor wall. Typically, the skin thermocouples are 1 or 2 to 4 or 6° C. below the internal bed temperature. Deviations from the baseline temperature are indicative of reactor operability problems. These deviations can be either positive or negative.

Positive skin thermocouple deviations are typically the result of reactor sheeting due to a "run away" reaction of the catalyst system(s) at the wall of the polymerization reactor. If the internal bed temperature increases to the point at which the melting point of the polymer is attained, a solid strip of polymer is formed and dislodged to the main body of the reactor resulting in severe operability problems. In many cases, several hours to days of a reactor shut down are required to remove the sheets before restarting the polymerization process. The transition in the present embodiment avoids such occurrences.

Negative skin thermocouple deviations are typically representative of "cold" polymer being situated at or attached to the wall of the polymerization reactor. This can present a problem if it persists since it means that a solid insulating layer is formed at the walls of the reactor. If this layer continues to grow, it can quickly transform into a reactor sheet. This phenomenon is referred to as "cold bands." It has been found that cold bands are often associated with the adherence of small polymer particles or "fines" to the wall of the reactor. Fines are generally defined as the percentage of the total distribution of particles passing through a 120 mesh standard sieve. This has a particle size equivalent of 120 microns. High levels of fines can lead to sheeting, fouling of the reactor cycle gas system and fouling of the heat exchanger distributor plate requiring a reactor shut down to clean out. It has been surprisingly found that following the procedure outlined herein avoids such occurrences as positive and negative thermocouple deviations and hence sheeting and other operability problems.

Preferably, the polymerization is conducted in a continuous gas phase fluidized bed reactor, wherein the fluidized bed is made up of polymer granules, preferably polyethylene granules. The gaseous feed streams of ethylene and hydrogen together with liquid comonomer (e.g., 1-hexene or 1-butene) are mixed together by any suitable means and introduced into the reactor, preferably below the reactor bed into a recycle gas line. The individual flow rates of ethylene, hydrogen and comonomer are controlled to maintain fixed composition targets. The ethylene concentration is controlled to maintain a desired ethylene partial pressure, typically from 120 or 140 or 160 to 190 or 200 psi. The hydrogen partial pressure is also controlled to maintain a constant hydrogen to ethylene mole ratio.

Co-catalyst or activator feeds are preferably injected separate from the other reactive gas feeds. Alkylaluminum co-catalyst and water are injected separately into the recycle gas line to effectuate polymerization using a metallocene/Ziegler mixed catalyst system. These are fed with rates proportional to the ethylene feed rate.

The alkylaluminum compound, or mixture of compounds, such as trimethylaluminum or triethylaluminum is feed into the reactor in one embodiment at a rate of from 10 wt. ppm to 500 wt. ppm (weight parts per million alkylaluminum feed rate compared to ethylene feed rate) in one embodiment, and from 50 wt. ppm to 400 wt. ppm in a more particular embodiment, and from 60 wt. ppm to 300 wt. ppm in yet a more particular embodiment, and from 80 wt. ppm to 250 wt. ppm in yet a more particular embodiment, and from 75 wt. ppm to 150 wt. ppm in yet another embodiment, wherein a desirable range may comprise any combination of any upper limit with any lower limit; and wherein preferably the rate of introduction of the alkylaluminum to the reactor is a substantially constant rate of addition within the range, varying for example by no more than ±15%. The alkylaluminum can be represented by the general formula $AlR_3$, wherein each R is the same or different and independently selected from $C_1$ to $C_{10}$ alkyls and alkoxys.

Water is added to the polymerization reactor at from 1 to 50 wt ppm based on the flow rate of the primary monomer in one embodiment, and present from 2 to 40 wt ppm in another embodiment; and present from 3 to 30 wt ppm in yet another embodiment; and wherein preferably the rate of introduction of the water to the reactor is a substantially constant rate of addition within the range, varying for example by no more than ±15%.

The catalysts are injected directly into the fluidized bed as a dry powder by any suitable means such as a rotating disk, etc., and using nitrogen gas carrier assist or inert hydrocarbon. The rate of catalyst injection is adjusted to maintain a constant production rate. The reacting bed of growing polymer particles are maintained in a fluidized state by the continuous flow of the ethylene, hydrogen and comonomer feed and recycle gas through the reaction zone; a superficial gas velocity of from 1.5 to 1.8 to 3 or 4 ft/sec is used to achieve this. The reactor is operated at a total pressure of from 200 to 350 psig in a preferred embodiment. To maintain a desired reactor temperature, the temperature of the recycle gas is continuously adjusted up or down to accommodate any changes in the rate of heat generation due to the polymerization; in a preferred embodiment, the reactor temperature is maintained at a temperature between 85° C. and 100° C.

At least one static voltage probe is located above the distributor plate in the polymerization reactor in a preferred embodiment, and is equipped with from 15 to 30 thermocouples mounted on the external surface of the reactor and expanded section. These are monitored continuously using a computer or other suitable means. Most preferably, the skin thermocouples are located at heights from between 10 and 80% above the distributor plate, and in the expanded section of the reactor above the fluidized bed.

Preferably, in the transition from mixed-to-chromium-based catalyst system, the fluidized bed reactor is first operating with a mixed catalyst system; the mixed catalyst most preferably comprising a $TiCl_4$/alkylmagnesium/alcohol catalyst, a bis(cyclopentadienyl)zirconium dihalide catalyst and methalumoxane as an activator all supported on an inorganic oxide porous support material such as silica having an average particle size of from 0.1 to 100 $\mu$m; water and alkylaluminum feeds are also maintained during the introduction into, or presence within, the reactor of the mixed catalyst in a preferred embodiment. To effectuate the polymerization process conducted in the presence of the mixed catalyst system, reactive gases are maintained in the reactor; a hydrogen to ethylene ($H_2/C_2$) mole ratio is preferably in the range from 0.007 to 0.016, a $C_3$ to $C_{10}$ alpha-olefin (comonomer "x") to ethylene ($C_x/C_2$) mole ratio of 0.006 to 0.020, the conditions such as to maintain a production rate of polymer of from 4,000 to 10,000 lb/hr and an ash content of 0.010 to 0.050 wt % in the polyethylene resulting therefrom.

Next, the introduction of mixed catalyst into the reactor is stopped, and the reaction between the mixed catalyst and monomers is allowed to die for from 30 min or 1 hour to 2 or 3 hours while maintaining reactor conditions, ethylene and comonomers, hydrogen, alkylaluminum, and water feeds. The fluidized bed level is preferably increased from its level when using the mixed catalyst system to prepare for a higher fluidized bulk density with the chromium-based catalyst; in one embodiment, the bed level is increased from 1 to 30% from its original level, and from 5 to 25% in another embodiment. Once the production rate of polymer drops to a desirably low level, preferably less than or equal to 4,000 lbs/hr, the alkylaluminum and water feed are stopped, and the reactor temperature is allowed to drop from 1 to 10° C. from its original level when polymerizing using the mixed catalyst system.

Next, a deactivating agent is injected into the reactor by any suitable means, and in any part of the reactor, preferably in the cycle gas line leading directly into the reactor, in an amount sufficient to deactivate or substantially deactivate the mixed catalyst system and/or the alkylaluminum co-catalyst. Preferably, the deactivating agent is one that will deactivate the metallocene and titanium-based Ziegler-Natta mixed catalyst, either directly, indirectly, or in addition to, by reacting with the alkylaluminum; and further the deactivating agent is one that will preferably not interfere with the chrome-based catalyst, or only reduce the chrome-based catalyst activity by less than 20%.

Circulating cycle gas (monomer, comonomers, hydrogen) is used to deliver the deactivating agent into the reactor and completely stop the reaction in one embodiment, but any suitable means of delivering the deactivating agent can be used such as a separate line into the reactor at any portion.

In one embodiment, the circulating gas made up of inert gases such as nitrogen and ethylene feed (and comonomer) is reduced only to the level necessary to maintain or substantially maintain (within 15%) the level of those gases in the reactor that were present during the mixed catalyst polymerization or that will be used during the chrome-based catalyst system polymerization. Most preferably, the feed of hydrogen, ethylene and comonomer is such as to maintain a constant level of these agents in the reactor and thus, as the polymerization reaction diminishes and then stops, the feed rates of these agents will drop or stop.

In one embodiment, the deactivating agent suitable for the mixed catalyst-to-chrome-based catalyst reactor transition is selected from $C_1$ to $C_{20}$ carboxylic acids and di-carboxylic acids, $C_2$ to $C_{20}$ anhydrides, $C_2$ to $C_{20}$ esters, carbonic acids and esters, and carbon dioxide. Preferably, the deactivating agent is an agent that can provide, or release through thermal, chemical or other suitable means a carbon dioxide moiety, and most preferably, the deactivating agent is carbon dioxide, such as the decomposition of carbonic acid, an alkyl hydrogen carbonate or carbamic acid, or the reaction of a di-carboxylic acid with $Ba(OH)_2$ to provide carbon dioxide. In one embodiment, the deactivating agent is pre-contacted with or otherwise adhered or supported on solid particles such as an inorganic oxide (e.g., silica, silica-alumina, mica, other clays) or solid polymer particles (polystyrene, polyethylene, etc.). The deactivating agent is added in an amount of from less than 10 lbs deactivating agent per 1000 lbs seedbed (10 g deactivating agent/kg seedbed) in one embodiment, and more preferably from less than 1 lbs deactivating agent per 1000 lbs seedbed (1 g deactivating agent/kg seedbed), and most preferably from less than 0.1 lbs deactivating agent per 1000 lbs seedbed (0.1 g deactivating agent/kg seedbed), and even more preferably from less than 0.05 lbs deactivating agent per 1000 lbs seedbed (0.05 g deactivating agent/kg seedbed).

One advantage of the present invention is the ability to transition between the mixed catalyst system and chrome-based catalyst system without flushing the reactor of reactive gases. Thus, in a preferred embodiment, a level of hydrogen, ethylene and comonomer is maintained in the reactor at all times during the transition, and preferably, the level is maintained at the ranges stated herein, the flow rates of these gases into the reactor altered to accommodate the changing activities and amounts of the catalysts.

Another advantage of the present invention of the mixed catalyst-to-chrome-based catalyst reactor transition is that the deactivating agent does not interfere with the reactivity of the chrome-based catalyst, or only reduces its polymerization activity by less than 20% in one embodiment, and by less than 10% in another embodiment. Thus, a relatively small amount of deactivating agent can be utilized, and further, this agent does not require "flushing" or purging prior to addition of the chrome-based catalyst system. Thus, in a preferred embodiment, after introduction of the deactivating agent, the agent is allowed to react for a time as specified above, followed by introduction of the chrome-based catalyst system, wherein the deactivating agent is maintained in the polymerization reactor; stated another way, after addition of the deactivating agent in a preferred embodiment, there is no purging step (such as by a flow of an inert gas or hydrocarbon liquid, e.g., nitrogen, pentane, etc.) or other process used to remove the deactivating agent other than the introduction of the chrome-based catalyst and the increase or re-introduction of reactive gases.

Once the polymerization reaction is determined to have completely stopped between the mixed catalyst system and monomers, excess deactivating agent is purged out of the reactor by purging with nitrogen from 30 min or 1 hour to 2 or 3 or 5 hours in one embodiment. In another embodiment, the deactivating agent is not purged from the reactor, but is allowed to make contact with the fluidized bed of polymer particles for from 1 min to 5 hours, followed by injection of the chrome-based catalyst system. In one embodiment the deactivating agent is contacted with the polymer particles for at least 30 min prior to addition of the chrome-based catalyst. In the embodiments where the deactivating agent is not purged from the reactor, the flow of reactive monomer gases will diminish and preferably stop as the polymerization reaction is quenched. Thus, in one embodiment, once the reaction has stopped due to the presence of deactivating agent, the ethylene and comonomer and hydrogen feed is stopped, followed then by reintroduction of ethylene into the reactor to establish optimal conditions for the chrome-based catalyst system. Preferably, only enough deactivating agent is added to the reactor to quench the mixed catalyst polymerization, thus eliminating the need to purge, or advantageously reducing the amount of purging required. In any case, once ethylene feed is established, the reactor temperature is raised to a level between 95° C. and 110° C. and the chrome-based catalyst feed started. The time between injection of the deactivating agent and the chrome-based catalyst ranges from 2 or 3 hours to 5 or 8 hours.

The optimal conditions for the chrome-based catalyst are built within the reactor. Once the appropriate conditions are achieved, the chrome-based catalyst feed is begun. Once the chrome-based catalyzed reaction begins, the reaction temperature within the reactor is increased to about 95° C., preferably to a temperature in the range of from about 90° C. to about 105° C., more preferably in the range of from about 93° C. to about 102° C. until reactor operability is assured.

One other advantage of the present invention is the capability of performing "closed reactor" transitions. Thus, preferably, the amount of polymer particles in the fluidized bed are substantially maintained in the polymerization zone and in fact may be increased prior to introducing the chrome-based catalyst, meaning that the polymer bed is not removed, or not exchanged from one bed to another during the transition as is common in the art. In one embodiment, "substantially maintained" means that no more than 20 or 30 wt % of the polymer particles in the polymerization reactor are removed and/or exchanged for another external source of polymer particles during the transition from the mixed catalyst to chrome-based catalyst. This can save from 30 to 100 hours in transition time.

To the extent the present invention pertains to transitioning from chrome-based catalyst systems to mixed metallocene/Ziegler-Natta catalyst systems and vice-versa, all olefin polymerization catalysts including chrome catalysts, conventional-type Ziegler-Natta transition metal catalysts and bulky ligand metallocene-type catalysts are suitable for use in the processes of the present invention. Also, the mixed catalyst system useful in the present invention comprising metallocene and at least one other active compound, including a second metallocene component. The following is a non-limiting discussion of the various polymerization catalysts and catalyst components useful in the present invention.

Chrome-Based Catalyst Systems

Chrome-based catalyst compounds suitable for use in the present invention include $CrO_3$, chromocene, silyl chromate, chromyl chloride ($CrO_2Cl_2$), and the like. Non-limiting examples are disclosed in U.S. Pat. Nos. 3,709,853, 3,709, 954, 3,231,550, 3,242,099 and 4,077,904. Other non-limiting examples are discussed in U.S. Pat. Nos. 4,152,502, 4,115,639, 4,077,904, 4,482,687, 4,564,605, 4,721,763, 4,879,359 and 4,960,741. Chrome-based catalyst systems may comprise an additional metal such as where the carrier material (e.g. silica) for the chrome-based catalyst is co-impregnated with, for example, a titanium compound such as titanium tetra-isopropoxide. Such systems are referred to herein as mixed chrome/Ziegler-Natta catalysts systems and such systems are suitable for use in the present invention for transitioning from as the first catalyst systems or for transitioning to as the second catalyst systems. Preferred chrome-based catalyst compounds are chromate compounds and silyl chromate catalyst systems are particularly preferred for use in the present invention.

Mixed Catalyst System

In a particular embodiment, the mixed catalyst system described herein comprise a metallocene and a titanium-containing Ziegler-Natta catalyst, an example of which is disclosed in U.S. Pat. No. 5,539,076, and WO 02/090393. Preferably, the catalyst compounds are supported, and in a particular embodiment, both catalyst components are supported with a "primary" activator, alumoxane in a particular embodiment, the support in a particular embodiment being an inorganic oxide support.

In one embodiment, a metallocene catalyst component, as part of the bimetallic catalyst composition, produces the LMW polyethylene. The metallocene catalyst compounds as described herein include "full sandwich" compounds having two Cp ligands (cyclopentadienyl and ligands isolobal to cyclopentadienyl) bound to at least one Group 3 to Group 12 metal atom, and one or more leaving group(s) bound to the at least one metal atom. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Hereinafter, these compounds will be referred to as "metallocenes" or "metallocene catalyst components".

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The metal atom "M" of the metallocene catalyst compound is selected from the group consisting of Groups 4, 5 and 6 atoms in one embodiment, and a Ti, Zr, Hf atoms in yet a more particular embodiment, and Zr in yet a more particular embodiment. The Cp ligand(s) form at least one chemical bond with the metal atom M to form the "metallocene catalyst compound". In one aspect of the invention, the metallocene catalyst components of the invention are represented by the formula (II):

$$Cp^A Cp^B MX_n \qquad (II)$$

wherein M is as described above; each X is bonded to M; each Cp group is chemically bonded to M; and n is 0 or an integer from 1 to 4, and either 1 or 2 in a particular embodiment.

The ligands represented by $Cp^A$ and $Cp^B$ in formula (II) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (II) may be unsubstituted or substituted with any one or combination of substituent groups R. Non-limiting examples of substituent groups R as used in structure (II) as well as ring substituents in structure (II) include hydrogen radicals, $C_1$ to $C_6$ alkyls, $C_2$ to $C_6$ alkenyls, $C_3$ to $C_6$ cycloalkyls, $C_6$ to $C_{10}$ aryls or alkylaryls, and combinations thereof.

Each X in the formula (II) and (III) is independently selected from the group consisting of halogen ions (fluoride, chloride, bromide), hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a particular embodiment; and fluoride in yet a more particular embodiment.

In another aspect of the invention, the metallocene catalyst component includes those of formula (1) where $Cp^A$ and $Cp^B$ are bridged to each other by at least one bridging group, (A), such that the structure is represented by formula (III):

$$Cp^A(A)Cp^B MX_n \qquad (III)$$

These bridged compounds represented by formula (III) are known as "bridged metallocenes". $Cp^A$, $Cp^B$, M, X and n in structure (III) are as defined above for formula (II); and wherein each Cp ligand is bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (II)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2 C=$, $R'_2 Si=$, $—Si(R')_2 Si(R'_2)—$, $R'_2 Ge=$, $R'P=$ (wherein "=" represents two chemical bonds), where R' is independently selected from the group consisting of hydride, $C_1$ to $C_{10}$ alkyls, aryls and substituted aryls.

In one embodiment, a Ziegler-Natta catalyst component, as part of the mixed catalyst system, produces the HMW polyethylene. Ziegler-Natta catalyst compounds are disclosed generally in ZIEGLER CATALYSTS 363–386 (G. Fink, R. Mulhaupt and H. H. Brintzinger, eds., Springer-Verlag 1995); and RE 33,683. Examples of such catalysts include those comprising Group 4, 5 or 6 transition metal oxides, alkoxides and halides, and more particularly oxides, alkoxides and halide compounds of titanium, zirconium or vanadium in combination with a magnesium compound, internal and/or external electron donors (alcohols, ethers, siloxanes, etc.), aluminum or boron alkyl and alkyl halides, and inorganic oxide supports.

In one embodiment, the Ziegler-Natta catalyst is combined with a support material, either with or without the metallocene catalyst component. The Ziegler-Natta catalyst component can be combined with, placed on or otherwise affixed to a support in a variety of ways. In one of those ways, a slurry of the support in a suitable non-polar hydrocarbon diluent is contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$–$C_{12}$ alkyl groups, or $C_4$–$C_{10}$ alkyl groups, or $C_4$–$C_8$ alkyl groups. In at least one specific embodiment, the organomagnesium compound is dibutyl magnesium.

The organomagnesium and alcohol-treated slurry is then contacted with a transition metal compound in one embodiment. Suitable transition metal compounds are compounds of Group 4 and 5 metals that are soluble in the non-polar hydrocarbon used to form the silica slurry in a particular embodiment. Non-limiting examples of suitable Group 4, 5 or 6 transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, in a particular embodiment from 1 to 6 carbon atoms. Mixtures of such transition metal compounds may also be used. In a preferred embodiment, $TiCl_4$ or $TiCl_3$ is the starting transition metal compound used to form the magnesium-containing Ziegler-Natta catalyst.

In one embodiment, the Ziegler-Natta catalyst is contacted with an electron donor, such as tetraethylorthosilicate (TEOS), an ether such as tetrahydrofuran, or an organic alcohol having the formula R"OH, where R" is a $C_1$–$C_{12}$ alkyl group, or a $C_1$ to $C_8$ alkyl group, or a $C_2$ to $C_4$ alkyl group, and/or an ether or cyclic ether such as tetrahydrofuran.

The metallocene and Ziegler-Natta components may be contacted with the support in any order. In a particular embodiment of the invention, the first catalyst component is reacted first with the support as described above, followed by contacting this supported first catalyst component with a second catalyst component.

When combined to form the bimetallic catalyst component, the molar ratio of metal from the second catalyst component to the first catalyst component (e.g., molar ratio of Ti:Zr) is a value of from 0.1 to 100 in one embodiment; and from 1 to 50 in another embodiment, and from 2 to 20 in yet another embodiment, and from 3 to 12 in yet another embodiment; and from 4 to 10 in yet another embodiment, and from 4 to 8 in yet another embodiment; wherein a desirable molar ratio of Ti component metal:Zr catalyst component metal is any combination of any upper limit with any lower limit described herein.

The polymerization process used to form the polyethylene compositions useful in making the films of the invention preferably comprises injecting a supported catalyst composition into the polymerization reactor. The catalyst components and activator(s) (metallocene and Ziegler-Natta components) can be combined in any suitable manner with the support, and supported by any suitable means know in the art. Preferably, the catalyst components are co-supported with at least one activator, preferably an alumoxane. Another activator, preferably an alkylaluminum, is co-injected into the polymerization reactor as a distinct component in another embodiment. In a most preferred embodiment, the bimetallic catalyst composition, preferably comprising a metallocene and Ziegler-Natta catalyst component, is injected into a single reactor, preferably a fluidized bed gas phase reactor, under polymerization conditions suitable for producing a bimodal polyethylene composition as described herein.

Supports, methods of supporting, modifying, and activating supports for single-site catalyst such as metallocenes is discussed in, for example, by G. G. Hlatky in 100(4) CHEM. REV. 1347–1374 (2000). The terms "support" as used herein refers to any support material, a porous support material in one embodiment, including inorganic or organic support materials. Particularly preferred support materials include silica, alumina, silica-alumina, magnesium chloride, graphite, and mixtures thereof in one embodiment. Most preferably, the support is silica. In a particular embodiment, the support is an inorganic oxide, preferably silica, having an average particle size of less than 50 μm or less than 35 μm and a pore volume of from 0.1 to 1 or 2 or 5 cm$^3$/g.

The support is preferably calcined. Suitable calcining temperatures range from 500° C. to 1500° C. in one embodiment, and from 600° C. to 1200° C. in another embodiment, and from 700° C. to 1000° C. in another embodiment, and from 750° C. to 900° C. in yet another embodiment, and from 800° C. to 900° C. in yet a more particular embodiment, wherein a desirable range comprises any combination of any upper temperature limit with any lower temperature limit. Calcining may take place in the absence of oxygen and moisture by using, for example, an atmosphere of dry nitrogen. Alternatively, calcining may take place in the presence of moisture and air.

The support may be contacted with the other components of the catalyst system in any number of ways. In one embodiment, the support is contacted with the activator to form an association between the activator and support, or a "bound activator". In another embodiment, the catalyst component may be contacted with the support to form a "bound catalyst component". In yet another embodiment, the support may be contacted with the activator and catalyst component together, or with each partially in any order. The components may be contacted by any suitable means as in a solution, slurry, or solid form, or some combination thereof, and may be heated when contacted to from 25° C. to 250° C.

In one embodiment, the bimetallic catalyst composition comprises at least one, preferably one, type of activator. As used herein, the term "activator" is defined to be any compound or combination of compounds, supported or unsupported, which can activate a single-site catalyst compound (e.g., metallocenes, metal amido catalysts, etc.), such as by creating a cationic species from the catalyst component. Embodiments of such activators include Lewis acids such as cyclic or oligomeric poly(hydrocarbylaluminum oxides). Preferably, the activator is an alumoxane, and more preferably, an alumoxane supported on an inorganic oxide support material, wherein the support material has been calcined prior to contacting with the alumoxane.

An alkylaluminum is also added, preferably to the polymerization reactor, as an activator of the Ziegler-Natta component of the bimetallic catalyst in one embodiment. The alkylaluminum activator may be described by the formula $AlR^§_3$, wherein $R^§$ is selected from the group consisting of $C_1$ to $C_{20}$ alkyls, $C_1$ to $C_{20}$ alkoxys, halogen (chlorine, fluorine, bromine) $C_6$ to $C_{20}$ aryls, $C_7$ to $C_{25}$ alkylaryls, and $C_7$ to $C_{25}$ arylalkyls. Non-limiting examples of alkylaluminum compounds include trimethylaluminum, triethylaluminum, triisobutylaluminum, tri-n-hexylaluminum, tri-noctylaluminum and the like. The alkylaluminum is preferably not supported on the support material with the catalyst components and "primary" activator (e.g., alumoxane), but is a separate component added to the reactor(s).

The alkylaluminum compound, or mixture of compounds, such as trimethylaluminum or triethylaluminum is feed into the reactor in one embodiment at a rate of from 10 wt. ppm to 500 wt. ppm (weight parts per million alkylaluminum feed rate compared to ethylene feed rate), and from 50 wt. ppm to 400 wt. ppm in a more particular embodiment, and from 60 wt. ppm to 300 wt. ppm in yet a more particular embodiment, and from 80 wt. ppm to 250 wt. ppm in yet a more particular embodiment, and from 75 wt. ppm to 150 wt. ppm in yet another embodiment, wherein a desirable range may comprise any combination of any upper limit with any lower limit.

Other primary or separately injected activators known in the art may also be useful in making the bimetallic catalyst compositions described herein. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000). Illustrative, not limiting examples of ionic ionizing activators include tri-alkyl substituted ammonium salts such as triethylammonium tetra(phenyl)boron and the like; N,N-dialkyl anilinium salts such as N,N-dimethylanilinium tetra(phenyl)boron and the like; dialkyl ammonium salts such as di(isopropyl) ammonium tetra(pentafluorophenyl)boron and the like; tri-aryl carbonium salts (trityl salts) such as triphenylcarbonium tetra(phenyl)boron and the like; and triaryl phosphonium salts such as triphenylphosphonium tetra(phenyl)boron and the like, and their aluminum equivalents.

When the activator is a cyclic or oligomeric poly (hydrocarbylaluminum oxide) (i.e., "alumoxane" such as methalumoxane "MAO"), the mole ratio of activator to catalyst component ranges from 2:1 to 100,000:1 in one embodiment, and from 10:1 to 10,000:1 in another embodiment, and from 50:1 to 2,000:1 in yet another embodiment; most preferably, the alumoxane is supported on an inorganic oxide such that, once co-supported with the metallocene, is present in a molar ratio of aluminum (alumoxane):Group 4, 5 or 6 metal (metallocene) from 500:1 to 10:1, and most preferably a ratio of from 200:1 to 50:1.

In order to provide a better understanding of the present invention, the following examples are offered as related to actual tests performed in the practice of this invention.

EXAMPLE 1

The following example was conducted in a fluidized bed reactor starting with a silylchromate-on-silica catalyst system with a running transition to an mixed catalyst system comprising a metallocene, ammonia and phosphorus.

Experimental indicators of operability problems utilize the measurement of temperatures which exist at the wall of the reactor. The temperature was measured using thermocouples known in the art as "skin thermocouples" since they measure temperature close to the reactor wall. Typically, the skin thermocouples are 5°10° F. (1°–4° C.) below the internal bed temperature. Deviations from the baseline are indicative of reactor operability problems. These deviations can be either positive or negative.

Positive skin thermocouple deviations are the result of reactor sheeting due to a run away reaction at the wall of the reactor. If the internal bed temperature increases to the point at which the melting point of the polymer is attained, a solid strip of polymer is formed and dislodged to the main body of the reactor resulting in severe operability problems. In many cases; several hours to days of a reactor shut down are required to remove the sheets before restarting the polymerization process.

Negative skin thermocouple deviations are less serious since this is representative of "cold" polymer being situated at the wall of the reactor. However, this can present a problem if it persists since it means that a solid insulating layer is formed at the walls of the reactor. If this layer continues to grow, it can quickly transform into a reactor sheet. This phenomenon is referred to as "cold bands." It has been found that cold bands are often associated with the adherence of small polymer particles or "fines" to the wall of the reactor. Fines are generally defined as the percentage of the total distribution of particles passing through a 120 mesh standard sieve. This has a particle size equivalent of 120 microns. Fines are important since high levels can lead to sheeting, fouling of the reactor cycle gas system and fouling of the heat exchanger distributor plate requiring a reactor shut down to clean out.

The polymerization was conducted in a continuous gas phase fluidized bed reactor. The fluidized bed is made up of polymer granules. The gaseous feed streams of ethylene and hydrogen together with liquid comonomer (hexene) were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a desired ethylene partial pressure, typically about 200 to 220 psi. The hydrogen partial pressure was controlled to maintain a constant hydrogen to ethylene mole ratio. The concentration of all the gases was measured by an on-line gas chromatograph to confirm the desired composition in the recycle gas stream.

The catalysts were injected directly into the fluidized bed as a dry powder from a shot feeder, entering the reactor at about the 2 ft level with nitrogen gas carrier assist. The rate of catalyst injection was adjusted to maintain a constant production rate. The reacting bed of growing polymer particles was maintained in a fluidized state by the continuous flow of the make up feed and recycle gas through the reaction zone. A superficial gas velocity of about 2.1 to 2.4 ft/sec was used to achieve this. The reactor was operated at a total pressure of about 265 psig. To maintain a desired reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which is simultaneously vented back to the reactor. This allows for highly efficient removal of the product, while at the same time recycling a large portion of the unreacted gases back to the reactor. The product was purged to remove entrained hydrocarbons and treated with a small stream of humidified nitrogen to deactivate any trace quantities of residual catalyst.

A static voltage probe was located at about the 1.5-foot level. The reactor was equipped with twenty-six thermocouples mounted on the external surface of the reactor and expanded section. These were monitored continuously using a Honeywell TDC 3000 process computer. The skin thermocouples were located at about the plate (about 2 inches above the plate), 1 foot, 2 feet, 3 feet, 5 feet, 8 feet, and cone. All skin thermocouples except the cone extended about ⅛ inch into the bed. The cone skin thermocouple was flush with the reactor wall and was located exactly at the halfway point in the cone.

As noted above, the fluidized bed reactor was started with a silylchromate-on-silica catalyst system which produces a product having a flow index (FI) of 8 and a density of 0.942 g/cc. Typical reaction conditions for the production of DSX4208H were: a temperature of 92 to 93° C., a total pressure within the reactor of 265 psig, an ethylene partial pressure of 208 psi, a hydrogen to ethylene ($H_2/C_2$) partial pressure ratio of 0.051, a hexene (comonomer) to ethylene ($C_6/C_2$) partial pressure ratio of 0.0081, a superficial gas velocity of 2.18 ft/sec, a fluidized bulk density of 30 lb/ft$^3$, a production rate of polymer of from 9,000 to 10,000 lb/hr and an ash content of 0.025 to about 0.056 wt %. There was rather intense static during this run which carried over into the beginning of the MDCC run.

The S-2 UCAT G-150 catalyst was stopped and the reaction was allowed to die for 6 hours while maintaining reactor conditions. This was done to reduce catalyst inventory in the bed as much as possible. There was essentially no sign of reaction after five hours based on the reactor temperature differential.

Oxygen was injected for 30 minutes through an $O_2$ addback system to kill the remaining catalyst. The feed rate was at least 0.05 pounds per hour (pph) of a 7.5 weight percent oxygen in nitrogen mixture. It is believed, however, that the first 25 minutes of oxygen feed to the reactor essentially failed to make it into the reactor system. This is because the oxygen feed point was to the main ethylene supply manifold downstream of the main ethylene supply valve. The main ethylene supply manifold was connected directly to the cycle gas line below the bottom head but there was no ethylene flow to sweep the oxygen in because the ethylene valve was closed. There was still about 3000 pph of ethylene flow to the reactor but this was to the taps that was supplied from a point upstream of the main ethylene supply valve (and downstream of the flow indicator). The situation was recognized and remedied after 25 minutes of oxygen feed by slightly opening the ethylene supply valve. This was the point in time that oxygen actually went into the reactor. There was perhaps a barely perceptible decrease in the reactor temperature differential but this could have been attributable to the instrument or a result of the small amount of fresh ethylene introduced with the oxygen to the cycle line. Oxygen add-back was continued for another 5 minutes for 30 minutes total. There was no change in static or skin thermocouples during this time.

The reactor was blown-down when the oxygen feed was stopped and was then purged with ethylene for 2 hours at 4,000 lbs/hr to achieve five gas volume change-outs (turn-overs) of ethylene. The temperature was about 76° C. and the ethylene partial pressure was about 70 to 84 psi. Higher temperatures could not be maintained in the absence of reaction and at reduced reactor pressure. The bed level was about 33 to 34 ft during this time.

Then mixed catalyst system reactor conditions were established except for the reaction temperature, which remained at about 78° C. and was held at this point until catalyst feed was begun. Once catalyst feed was achieved, the reaction began very quickly and was established within about 5 to 15 minutes.

After the mixed catalyst feed started, the static was in a broad band with some positive spikes but essentially zeroed within about 24 hours. The four 5 ft. skin thermocouples were initially depressed by −15 to −20° C. but returned to about −2 to −3 C. within about four hours of starting catalyst feed. The four expanded section skin thermocouples were about −8 to −10° C. going into the transition and remained there through the transition and throughout the mixed catalyst system run.

There was a marked decrease in the resin fluidized bulk density over the next three bed turnovers and the bed weight was systematically decreased from 40,000 to 27,000 lbs to maintain the bed level just below the start of the transition section.

EXAMPLE 2

The following example was conducted in a fluidized bed reactor starting with a metallocene catalyst system and running transition to a silyl-chromate catalyst system.

Experimental indicators of operability problems utilize the measurement of temperatures which exist at the wall of the reactor. The temperature was measured using thermocouples known in the art as "skin thermocouples" since they measure temperature close to the reactor wall. Typically, the skin thermocouples are 5°10° F. (1°–4° C.) below the internal bed temperature. Deviations from the baseline are indicative of reactor operability problems. These deviations can be either positive or negative.

Positive skin thermocouple deviations are the result of reactor sheeting due to a run away reaction at the wall of the reactor. If the internal bed temperature increases to the point at which the melting point of the polymer is attained, a solid strip of polymer is formed and dislodged to the main body of the reactor resulting in severe operability problems. In many cases; several hours to days of a reactor shut down are required to remove the sheets before restarting the polymerization process.

Negative skin thermocouple deviations are less serious since this is representative of "cold" polymer being situated at the wall of the reactor. However, this can present a problem if it persists since it means that a solid insulating layer is formed at the walls of the reactor. If this layer continues to grow, it can quickly transform into a reactor sheet. This phenomenon is referred to as "cold bands." It has been found that cold bands are often associated with the adherence of small polymer particles or "fines" to the wall of the reactor. Fines are generally defined as the percentage of the total distribution of particles passing through a 120 mesh standard sieve. This has a particle size equivalent of 120 microns. Fines are important since high levels can lead to sheeting, fouling of the reactor cycle gas system and fouling of the heat exchanger distributor plate requiring a reactor shut down to clean out.

The polymerization was conducted in a continuous gas phase fluidized bed reactor. The fluidized bed is made up of polymer granules. The gaseous feed streams of ethylene and hydrogen together with liquid comonomer (1-hexene) were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a desired ethylene partial pressure, typically about 200 to 220 psi. The hydrogen partial pressure was controlled to maintain a constant hydrogen to ethylene mole ratio. The concentration of all the gases was measured by an on-line gas chromatograph to confirm the desired composition in the recycle gas stream.

The catalysts were injected directly into the fluidized bed as a dry powder from a shot feeder, entering the reactor at about the 2 ft level with nitrogen gas carrier assist. The rate of catalyst injection was adjusted to maintain a constant production rate. The reacting bed of growing polymer particles was maintained in a fluidized state by the continuous flow of the make up feed and recycle gas through the reaction zone. A superficial gas velocity of about 2.1 ft/sec was used to achieve this. The reactor was operated at a total pressure of about 265 psig. To maintain a desired reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which is simultaneously vented back to the reactor. This allows for highly efficient removal of the product, while at the same time recycling a large portion of the unreacted gases back to the reactor. The product was purged to remove entrained hydrocarbons and treated with a small stream of humidified nitrogen to deactivate any trace quantities of residual catalyst.

A static voltage probe was located at about the 1.5-foot level. The reactor was equipped with twenty-six thermocouples mounted on the external surface of the reactor and expanded section. These were monitored continuously using a Honeywell TDC 3000 process computer. The skin thermocouples were located at about the plate (about 2 inches above the plate), 1 foot, 2 feet, 3 feet, 5 feet, 8 feet, and cone. All skin thermocouples except the cone extended about ⅛ inch into the bed. The cone skin thermocouple was flush with the reactor wall and was located exactly at the halfway point in the cone.

As noted above, the fluidized bed reactor was started with a metallocene catalyst system (a BisCp $ZrCl_2$ catalyst with MAO as activator). Typical reaction conditions were: a temperature of 94–95° C., a total pressure within the reactor of 249–265 psig, an ethylene partial pressure of 208–230 psi, a hydrogen to ethylene ($H_2/C_2$) mole ratio of 0.00007–0.025, a hexene (comonomer) to ethylene ($C_6/C_2$) concentration ratio of 0.0045–0.0060, a superficial gas velocity of 1.9–2.1 ft/sec, a fluidized bulk density of 19–21 lb/ft$^3$, a production rate of polymer of from 5,700 to 9,200 lb/hr and an ash content of 0.031 to 0.065 wt %.

The metallocene catalyst was stopped and the reaction was allowed to die for 2.5 hours while maintaining reactor conditions for the metallocene reaction. The reaction was dead in 2.5 hours as noted by a 5° C. temperature drop and a reduction in production rate to 1000 pph. The $C_6/C_2$ mole ratio was reduced from metallocene's 0.020 to about 0.005 with the aid of a blowoff during the die-off of the metallocene reaction. The hydrogen concentration was held at 150 ppm.

Once the metallocene reaction had died-off, the reactor temperature was raised from 85° C. to about 90° C. and the silylchromate-on-silica catalyst feed was started 3 hours and 10 minutes after discontinuing the metallocene catalyst feed. The hydrogen remained at about 150 to 170 ppm initially on $H_2/C_2$ flow ratio control and then with no hydrogen addition for the first bed turnover (BTO) of silylchromate-on-silica catalyst operation to ensure there was no reactivation of the metallocene by hydrogen. The silylchromate-on-silica catalyst reaction initiated almost immediately after starting the S-2 catalyst feed at a feed rate target of 2 pph.

The reaction was maintained at 90° C. for one bed turnover (BTO) and was then increased stepwise to 95° C., the target temperature for the silylchromate-on-silica catalyst, in increments of 0.5 to 1° C. with each half to 1 bed turnover so as to prevent agglomeration of the low-density metallocene transition bed.

EXAMPLE 3

The following example was conducted in a fluidized bed reactor starting with a mixed Ziegler-Natta and metallocene catalyst system and running transition to a silyl-chromate catalyst system ("chrome-based" catalyst system). The polymerization reactor is a single gas phase reactor, reactor diameter is 8 ft, reactor height is 38 ft.

Experimental indicators of operability problems utilize the measurement of temperatures which exist at the inside wall of the reactor. The temperature was measured using thermocouples known in the art as "skin thermocouples" since they measure temperature close to the reactor wall. Typically, the skin thermocouples are 5°–10° F. (1°–4° C.) below the internal bed temperature. Deviations from the baseline are indicative of reactor operability problems. These deviations can be either positive or negative.

Positive skin thermocouple deviations are the result of reactor sheeting due to a run away reaction at the wall of the reactor. If the internal bed temperature increases to the point at which the melting point of the polymer is attained, a solid strip of polymer is formed and dislodged to the main body of the reactor resulting in severe operability problems. In many cases; several hours to days of a reactor shut down are required to remove the sheets before restarting the polymerization process.

Negative skin thermocouple deviations are less serious since this is representative of "cold" polymer being situated at the wall of the reactor. However, this can present a problem if it persists since it means that a solid insulating layer is formed at the walls of the reactor. If this layer continues to grow, it can quickly transform into a reactor sheet. This phenomenon is referred to as "cold bands." It has been found that cold bands are often associated with the adherence of small polymer particles or "fines" to the wall of the reactor. Fines are generally defined as the percentage of the total distribution of particles passing through a 120 mesh standard sieve. This has a particle size equivalent of 120 microns. Fines are important since high levels can lead to sheeting, fouling of the reactor cycle gas system and fouling of the heat exchanger distributor plate requiring a reactor shut down to clean out.

The polymerization was conducted in a continuous gas phase fluidized bed reactor. The fluidized bed is made up of polymer granules. The gaseous feed streams of ethylene and hydrogen together with liquid comonomer (1-butene) were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a desired ethylene partial pressure, typically about 160 to 190 psi. The hydrogen partial pressure was controlled to maintain a constant hydrogen to ethylene mole ratio. The concentration of all the gases was measured by an on-line gas chromatograph to confirm the desired composition in the recycle gas stream.

Trimethyl aluminum and water are injected separately into the recycle gas line. These are fed with rates proportional to the ethylene feed rate.

The catalysts were injected directly into the fluidized bed as a dry powder from a rotating disk, entering the reactor at about the 8 ft above the distributor plate using nitrogen gas carrier assist. The rate of catalyst injection was adjusted to maintain a constant production rate. The reacting bed of growing polymer particles was maintained in a fluidized state by the continuous flow of the make up feed and recycle gas through the reaction zone. A superficial gas velocity of about 2.1 ft/sec was used to achieve this. The reactor was operated at a total pressure of about 260 psig. To maintain a desired reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The polymer product was removed semi-continuously via a series of valves into a fixed volume chamber, which is simultaneously vented back to the reactor. This allows for highly efficient removal of the product, while at the same time recycling a large portion of the unreacted gases back to the reactor. The product was purged to remove entrained hydrocarbons and treated with a small stream of humidified nitrogen to deactivate any trace quantities of residual catalyst.

A static voltage probe was located at about the 8 feet above the distributor plate. The reactor was equipped with at least twenty-four thermocouples mounted on the external surface of the reactor and expanded section. These were monitored continuously using a Honeywell TDC process computer. The skin thermocouples were located at heights above the distributor plate of about 2.5 feet, 5 feet, 7 feet, and in the expanded section.

As noted above, the fluidized bed reactor was operating with a mixed Ziegler-Natta and metallocene catalyst system (a $TiCl_4$/di-butyl-Mg/butanol Ziegler-Natta catalyst with bis (n-butyl-cyclopentadienyl)zirconium difluoride catalyst with MAO as activator). Typical reaction conditions were: a temperature of 94 to 96° C., a total pressure within the reactor of 249 to 265 psig, an ethylene partial pressure of 160 to 190 psi, a hydrogen to ethylene ($H_2/C_2$) mole ratio of 0.009 to 0.013, a butene (comonomer) to ethylene ($C_6/C_2$) concentration ratio of 0.013 to 0.014, a tri-methyl aluminum feedrate of 100 lb per 1,000,000 lbs ethylene, a water feedrate of 22 lb per 1,000,000 ethylene, a superficial gas velocity of 2.0 to 2.2 ft/sec, a fluidized bulk density of 14–19 lb/ft$^3$, a production rate of polymer of from 5,000 to 8,000 lb/hr and an ash content of 0.020 to 0.040 wt %.

The ZN-metallocene catalyst was stopped and the reaction was allowed to die for 1.5 hours while maintaining reactor conditions, ethylene, 1-butene, hydrogen, TMA (trimethylaluminum), and water feed for the ZN-metallocene reaction. Fluidized bed level (level of polymer particles) was increased from its normal level of about 38 ft to about 40 ft, to prepare for a higher fluidized bulk density with the chromium catalyst. After 1.5 hours, production rate had decreased from 7,700 lb/hr to about 4,000 lb/hr. TMA and water feed were stopped, and the reactor temperature decreased to about 93° C. Then about 50 lb $CO_2$ was injected into the cycle gas system. Circulating cycle gas carried this $CO_2$ into the reactor and this completely stopped the reaction.

Excess $CO_2$ was purged out of the reactor by purging with about 3,500 lb/hr nitrogen for 2.5 hours. Then ethylene was fed to the reactor. Once ethylene feed was established, the reactor temperature was raised from 95° C. to about 102° C. and the chrome-based catalyst feed was started 4 hours after injecting the deactivating agent, $CO_2$. The chrome-based catalyst reaction initiated quickly after starting the chromium-based catalyst feed at a feed rate target of about 1.8 pph.

The chrome-based catalyst was produced using Davison 955 silica, pretreated at 600° C., reacted with bis(triphenyl) silyl chromate in isopentane at 45° C., followed by treatment with DEALE (diethylaluminum ethoxide) at 45° C.

The reaction initiated smoothly, with no indication of positive skin temperature deviations (sheeting) or negative skin temperature deviations (cold bands). Reactor static levels were outstanding during this transition, remaining between –0.05 and –0.13 kV. Reaction continued smoothly as the production rate reached 9,000–11,000 lb/hr. Fluidized bulk density reached 22 to 25 lb/ft$^3$. As fluidized bulk density increased during the first five hours of chrome-based catalyst feed, the amount of product discharged was minimized to allow bed level to remain near the target level.

EXAMPLE 4

This example was conducted using equipment similar to that in Example 3, with the following exceptions:

1. The polymerization reactor used was a continuous gas phase fluidized bed reactor with the following dimensions: straight-side inside diameter=13.25 inches; straight-side height=10 ft. Total system volume about 50 ft$^3$ Bed volume with full bed=9.4 ft$^3$.
2. The ethylene partial pressure was maintained at around 200 psia.
3. TMA was fed directly to the fluidized bed, and water was fed in the reactor cycle line.
4. Catalyst was fed approximately 6 inches above the distributor plate.
5. The superficial gas velocity of the fluidizing gas was approximately 1.9 ft/s.
6. The reactor total pressure was 300 psig.
7. The fluidized bed was maintained at a constant weight by withdrawing a portion of the bed at a rate equal to the rate of formation of particulate product. The polymer product was removed semi-continuously via a series of valves into a fixed volume chamber. The product was treated with a small stream of humidified nitrogen to deactivate any trace quantities of residual catalyst.
8. The reactor was equipped with a static probe and seven external thermocouples along the straight and expanded sections.

The fluidized bed reactor was operating with a mixed Ziegler-Natta and metallocene catalyst system (a $TiCl_4$/di-butyl-Mg/butanol Ziegler-Natta catalyst with bis(n-butyl-cyclopentadienyl)zirconium difluoride catalyst with MAO as activator). Typical reaction conditions were: a temperature of 94 to 96° C., a total pressure within the reactor of 290 to 300 psig, an ethylene partial pressure of 195 to 205 psi, a hydrogen to ethylene ($H_2/C_2$) mole ratio of 0.008 to 0.011, a hexene (comonomer) to ethylene ($C_6/C_2$) concentration ratio of 0.0065 to 0.0075, a trimethylaluminum feedrate of 100 lb per 1,000,000 lbs ethylene, a water feedrate of 21 lb per 1,000,000 ethylene, a superficial gas velocity of 2.0 to 2.2 ft/sec, and a production rate of polymer of from 25 to 35 lb/hr.

The ZN-metallocene catalyst was stopped and the reaction was allowed to die to half-rate while maintaining reactor conditions, TMA, and water feed for the ZN-metallocene reaction. TMA and water feed were then stopped. A bed weight (weight of polymer particles) of about 100 lbs was maintained, then about 0.003 lb $CO_2$ (0.03 g $CO_2$ per kg of bed) was injected into the cycle gas system over a period of one hour. Circulating cycle gas carried this $CO_2$ into the reactor and this completely stopped the reaction.

Excess $CO_2$ was purged out of the reactor by venting down to 30 psig then repressurizing with nitrogen to 130 psig. This vent/pressurization cycle was completed 4 times. Then the following conditions were built in the reactor: an ethylene partial pressure of 250 psi, a reactor temperature of 92° C., 0.2 mole % n-hexene, and a 0.01 hydrogen/ethylene molar ratio. The chromium-based catalyst feed was started at about 8 hours after stopping ZN-metallocene catalyst feed. The chrome-based catalyst reaction initiated very quickly with a catalyst feed rate of about 3.5 g/hr of catalyst.

The reaction initiated smoothly, with no indication of positive skin temperature deviations (sheeting) or negative skin temperature deviations (cold bands). Reactor static levels were relatively constant with no significant noise or deviation during the transition. Reaction continued smoothly as the production rate reached about 30 lb/hr.

EXAMPLE 5

This example was conducted using equipment similar to that in Example 4.

The fluidized bed reactor was operating with a mixed Ziegler-Natta and metallocene catalyst system (a $TiCl_4$/di-butyl-Mg/butanol Ziegler-Natta catalyst with bis(n-butyl-cyclopentadienyl)zirconium difluoride catalyst with MAO as activator). Typical reaction conditions were: a temperature of 94–96° C., a total pressure within the reactor of 290–300 psig, an ethylene partial pressure of 195–205 psi, a hydrogen to ethylene ($H_2/C_2$) mole ratio of 0.008–0.011, a 1-hexene (comonomer) to ethylene ($C_6/C_2$) concentration ratio of 0.008–0.009, a tri-methyl aluminum feedrate of 100 lb per 1,000,000 lbs ethylene, a water feedrate of 24 lb per 1,000,000 ethylene, a superficial gas velocity of 2.0 to 2.2 ft/sec, and a polymer production rate of from 25–35 lb/hr.

The ZN-metallocene (mixed) catalyst was stopped and the reaction was allowed to die to half-rate while maintaining reactor conditions, TMA, and water feed for the ZN-metallocene reaction. TMA and water feed were then stopped. A bed weight (weight of polymer particles) of about 100 lbs was maintained, then about 0.003 lb $CO_2$ (0.03 g $CO_2$ per kg of bed) was injected into the cycle gas system over a period of one hour. Circulating cycle gas carried this $CO_2$ into the reactor and this completely stopped the reaction.

Excess $CO_2$ was purged out of the reactor by venting down to 30 psig then repressurizing with nitrogen to 130 psig. This vent/pressurization cycle was completed 4 times. Then the following conditions were built in the reactor: an ethylene partial pressure of 250 psi, a reactor temperature of 92° C., a 0.002 1-hexene/ethylene molar ratio, and a 0.01 hydrogen/ethylene molar ratio. The chromium-based catalyst feed was started at about 6 hours after stopping ZN-metallocene catalyst feed. The chrome-based catalyst reaction initiated very quickly with a catalyst feed rate of about 3.5 g/hr of catalyst.

The reaction initiated smoothly, with no indication of positive skin temperature deviations (sheeting) or negative skin temperature deviations (cold bands). Reactor static levels were relatively constant with no significant noise or deviation during the transition. Reaction continued smoothly as the production rate reached about 35 lb/hr.

COMPARATIVE EXAMPLE

This comparative example exemplifies an "open bed" transition, wherein the polymer bed in the polymerization reactor was removed and replaced in order to transition from a mixed catalyst to a chromium-based catalyst. The transition is completed in about 44 hours, much longer than demonstrated with the improved transition method. This example was conducted using equipment similar to that in Example 3, with the following exceptions:
1. The reactor is a continuous gas phase fluidized bed reactor that has the following dimensions: 14.5 ft diameter and a 44 ft bed height.
2. The ethylene partial pressure was maintained at around 200 psia.
3. Catalyst was fed approximately 3 ft above the distributor plate.
4. The superficial gas velocity of the fluidizing gas was approximately 2.5 ft/s.
5. The reactor total pressure was 300 psig.
6. The reactor was equipped with a static probe and about nineteen external thermocouples along the straight and expanded sections.

The fluidized bed reactor was operating with a mixed Ziegler-Natta and metallocene catalyst system (a $TiCl_4$/di-butyl-Mg/butanol Ziegler-Natta catalyst with bis(n-butyl-cyclopentadienyl)zirconium difluoride catalyst with MAO as activator). Typical reaction conditions were: a temperature of 94 to 96° C., a total pressure within the reactor of 290 to 300 psig, an ethylene partial pressure of 195 to 205 psi, a hydrogen to ethylene ($H_2/C_2$) mole ratio of 0.006 to 0.008, a 1-hexene (comonomer) to ethylene ($C_6/C_2$) concentration ratio of 0.0090 to 0.013, a trimethylaluminum feedrate of 120 lb per 1,000,000 lbs ethylene, a water feedrate of 17 lb per 1,000,000 ethylene, a superficial gas velocity of 2.4 to 2.6 ft/sec, and a production rate of polymer of from 75,000 to 80,000 lb/hr.

The ZN-metallocene (mixed) catalyst was stopped and the reaction rate was allowed to decrease for 15 minutes. Then the reaction was completely killed by injecting carbon monoxide (CO). The seedbed was removed from the reactor using the discharge system. Water was injected into the reactor to neutralize any tri-methyl aluminum residues. Hydrocarbons were purged out of the reactor to allow safe opening of the reactor. The reactor was opened to the atmosphere to allow proper connections for loading a new seedbed. This granular seedbed was conveyed into the reactor using nitrogen. This seedbed was dried using nitrogen purges while holding the bed temperature at about 100° C. After the seedbed was sufficiently dry, the following conditions were built in the reactor: an ethylene partial pressure of 150 psi, a reactor temperature of 104° C., 0.2 mole % 1-hexene, and a 0.0001 hydrogen/ethylene molar ratio. The chrome-based catalyst feed was started at about 44 hours after stopping mixed catalyst feed. The chrome-based catalyst reaction initiated very quickly with a catalyst feed rate of about 20 lb/hr.

The reaction initiated smoothly, with no indication of positive skin temperature deviations (sheeting) or negative skin temperature deviations (cold bands). Reactor static levels were relatively constant with no significant noise or deviation during the transition. Reaction continued smoothly as the production rate reached about 46,000 lb/hr.

It is expected that if the transition takes place in the absence of the appropriate deactivating agent, the alkylaluminum in the reactor will react with the chrome-based catalyst in such as way as to lower its activity to a disadvantage.

What is claimed is:
1. A process of transitioning from a first polymerization reaction conducted in the presence of a mixed catalyst system to a second polymerization reaction conducted in the presence of a chrome-based catalyst system, the polymerization reactions being conducted in a polymerization zone of a gas phase fluidized bed reactor which contains a fluidized bed of polymer particles and monomer gases the transition comprising the steps of:
  a) discontinuing the introduction of the mixed catalyst system into the reactor,
  b) maintaining polymerization conditions in the reactor and permitting polymerization to continue for a period of time to allow the components of the mixed catalyst system present in the reactor to produce additional polymer particles;

c) introducing to the reactor a deactivating agent into the fluidized bed;

d) establishing optimal conditions within the reactor for the chrome-based catalyst system; and e) introducing the chrome-based catalyst system into the reactor;

characterized in that the amount of polymer particles in the fluidized bed is substantially maintained in the polymerization zone during the transition steps; and wherein the mixed catalyst system comprises a metallocene component and a titanium-based Ziegler-Natta component.

2. The process of claim 1, wherein the deactivating agent is not removed from the reactor before introduction of the chrome-based catalyst.

3. The process of claim 1, wherein the deactivating agent is selected from the group consisting of $C_1$ to $C_{20}$ carboxylic acids and di-carboxylic acids, $C_2$ to $C_{20}$ anhydrides, $C_2$ to $C_{20}$ esters, carbonic acids and esters, carbon dioxide, and mixtures thereof.

4. The process of claim 1, wherein the deactivating agent is $CO_2$.

5. The process of claim 1, wherein the monomer gases comprise ethylene; and wherein the monomer gases further comprises at least one $C_3$ to $C_{10}$ α-olefin monomer.

6. The process of claim 1, wherein the components of the mixed catalyst system present in the polymerization zone are permitted to produce additional polymer for a period of up to 10 hours after discontinuing the introduction of the mixed catalyst system into the polymerization zone.

7. The process of claim 1, wherein the transition comprises less than or equal to 5 volume turnovers of monomer gases.

8. The process of claim 1, wherein in going from step (c) to step (d), the deactivating agent is contacted with the polymer particles for at least 30 min.

9. The process of claim 8, wherein the deactivating agent is not flushed from the reactor.

10. The process of claim 1, wherein the gas phase fluidized bed reactor comprises an inside wall at the polymerization zone, and wherein the temperature of the inside wall is maintained to within 1 to 6° C. below the polymerization temperature.

11. The process of claim 1, wherein the monomer gases are not removed from the polymerization reactor in (b) and (c).

12. The process of claim 1, wherein the amount of deactivating agent added to the polymerization reactor is less than 10 g deactivating agent/kg seedbed.

13. The process of claim 1, wherein the amount of deactivating agent added to the polymerization reactor is less than 1 g deactivating agent/kg seedbed.

14. A process of transitioning from a first polymerization reaction conducted in the presence of a mixed catalyst system to a second polymerization reaction conducted in the presence of a chrome-based catalyst system, the polymerization reactions being conducted in a polymerization zone of a gas phase fluidized bed reactor which contains a fluidized bed of polymer particles and monomer gases, the transition comprising the steps of:

a) discontinuing the introduction of the mixed catalyst system into the reactor;

b) maintaining polymerization conditions in the reactor and permitting polymerization to continue for a period of time to allow the components of the mixed catalyst system present in the reactor to produce additional polymer particles;

c) introducing to the reactor a deactivating agent into the fluidized bed;

d) establishing optimal conditions within the reactor for the chrome-based catalyst system; and e) introducing the chrome-based catalyst system into the reactor;

characterized in that the amount of polymer particles in the fluidized bed is substantially maintained in the polymerization zone during the transition steps; and wherein the deactivating agent is selected from the group consisting of $C_1$ to $C_{20}$ carboxylic acids and di-carboxylic acids, $C_2$ to $C_{20}$ anhydrides, $C_2$ to $C_{20}$ esters, carbonic acids and esters, carbon dioxide, and mixtures thereof.

15. A process of transitioning from a first polymerization reaction conducted in the presence of a mixed catalyst system to a second polymerization reaction conducted in the presence of a chrome-based catalyst system, the polymerization reactions being conducted in a polymerization zone of a gas phase fluidized bed reactor which contains a fluidized bed of polymer particles and monomer gases, the transition comprising the steps of:

a) discontinuing the introduction of the mixed catalyst system into the reactor;

b) maintaining polymerization conditions in the reactor and permitting polymerization to continue for a period of time to allow the components of the mixed catalyst system present in the reactor to produce additional polymer particles;

c) introducing to the reactor a deactivating agent into the fluidized bed;

d) establishing optimal conditions within the reactor for the chrome-based catalyst system; and e) introducing the chrome-bed catalyst system into the reactor;

characterized in that the amount of polymer particles in the fluidized bed is substantially maintained in the polymerization zone during the transition steps; and wherein the transition comprises less than or equal to 5 volume turnovers of monomer gases.

16. A process of transitioning from a first polymerization reaction conducted in the presence of a mixed catalyst system to a second polymerization reaction conducted in the presence of a chrome-based catalyst system, the polymerization reactions being conducted in a polymerization zone of a gas phase fluidized bed reactor which contains a fluidized bed of polymer particles and monomer gases, the transition comprising the steps of:

a) discontinuing the introduction of the mixed catalyst system into the reactor;

b) maintaining polymerization conditions in the reactor and permitting polymerization to continue for a period of time to allow the components of the mixed catalyst system present in the reactor to produce additional polymer particles;

c) introducing to the reactor a deactivating agent into the fluidized bed;

d) establishing optimal conditions within the reactor for the chrome-based catalyst system; and e) introducing the chrome-based catalyst system into the reactor;

characterized in that the amount of polymer particles in the fluidized bed is substantially maintained in the polymerization zone during the transition steps; and wherein the gas phase fluidized bed reactor comprises an inside wall at the polymerization zone, and wherein the temperature of the inside wall is maintained to within 1 to 60° C. below the polymerization temperature.

17. The process of any one of claim 14, 15 or 16, wherein the monomer gases are not removed from the polymerization reactor in (b) and (c).

18. The process of any one of claim 14, 15 or 16, wherein the amount of deactivating agent added to the polymerization reactor is less than 10 g deactivating agent/kg seedbed.

19. The process of any one of claim 14, 15 or 16, wherein the amount of deactivating agent added to the polymerization reactor is less than 1 g deactivating agent/kg seedbed.

* * * * *